(12) United States Patent
Farmer

(10) Patent No.: US 7,339,483 B1
(45) Date of Patent: Mar. 4, 2008

(54) AUTOMATED CONSUMER TO BUSINESS ELECTRONIC MARKETPLACE SYSTEM

(75) Inventor: Bennie L. Farmer, Ann Arbor, MI (US)

(73) Assignee: Telanon, Inc., Ann Arbor, MI (US)

( * ) Notice: Subject to any disclaimer, the term of this patent is extended or adjusted under 35 U.S.C. 154(b) by 214 days.

(21) Appl. No.: 10/825,967

(22) Filed: Apr. 16, 2004

Related U.S. Application Data

(63) Continuation-in-part of application No. 10/690,459, filed on Oct. 20, 2003, which is a continuation of application No. 09/638,177, filed on Aug. 11, 2000, now abandoned.

(60) Provisional application No. 60/463,380, filed on Apr. 16, 2003.

(51) Int. Cl.
*G08B 23/00* (2006.01)

(52) U.S. Cl. .................... 340/576; 340/425.5; 340/439

(58) Field of Classification Search ................ 340/576, 340/425.5, 439, 438, 995.24, 995.27, 7.48, 340/573.1; 701/29, 35; 705/4, 13
See application file for complete search history.

(56) References Cited

U.S. PATENT DOCUMENTS

| | | | |
|---|---|---|---|
| 5,223,844 A | 6/1993 | Mansell et al. | |
| 5,319,374 A | 6/1994 | Desai et al. | |
| 5,365,451 A | 11/1994 | Wang et al. | |
| 5,430,432 A | 7/1995 | Camhi et al. | |
| 5,499,182 A | 3/1996 | Ousborne | |
| 5,500,806 A | 3/1996 | Bellin et al. | |
| 5,548,273 A | 8/1996 | Nicol et al. | |
| 5,550,551 A | 8/1996 | Alesio | |
| 5,638,273 A | 6/1997 | Coiner et al. | |
| 5,694,322 A | 12/1997 | Westerlage et al. | |
| 5,797,134 A | 8/1998 | McMillan et al. | |
| 6,047,234 A | 4/2000 | Cherveny et al. | |
| 6,064,970 A | 5/2000 | McMillan et al. | |
| 6,438,491 B1 | 8/2002 | Farmer | |
| 6,516,267 B1 | 2/2003 | Cherveny et al. | |
| 6,677,858 B1 * | 1/2004 | Faris et al. | 340/573.1 |
| 6,812,851 B1 * | 11/2004 | Dukach et al. | 340/815.4 |
| 6,832,156 B2 | 12/2004 | Farmer | |
| 6,868,386 B1 | 3/2005 | Henderson et al. | |
| 6,871,140 B1 * | 3/2005 | Florance et al. | 701/207 |

(Continued)

FOREIGN PATENT DOCUMENTS

| | | |
|---|---|---|
| WO | 9845823 | 10/1998 |
| WO | 0160083 | 8/2001 |

OTHER PUBLICATIONS

Getconnected.com, 1999-2000.
Fleet Owners & Vehicle Manufacturers & About Wireless Car, WirelessCar, 2000.

(Continued)

*Primary Examiner*—John A. Tweel, Jr.
(74) *Attorney, Agent, or Firm*—Hahn Loeser & Parks

(57) ABSTRACT

An automotive consumer to business electronic marketplace system is presented, wherein various aspects of vehicle operation, driver status or driver behavior are monitored and reported to an electronic marketplace. Suppliers of insurance products and other suppliers of automobile products or services may offer vehicle owners prices for products or services based on the data reported. The system may further allow the driver to choose monitoring and reporting options based on discounts offered for certain reporting options.

31 Claims, 6 Drawing Sheets

U.S. PATENT DOCUMENTS

| | | | |
|---|---|---|---|
| 6,944,536 B2* | 9/2005 | Singleton | 701/209 |
| 2001/0036224 A1 | 11/2001 | Demallo et al. | |
| 2003/0004644 A1 | 1/2003 | Farmer | |
| 2004/0139034 A1 | 7/2004 | Farmer | |
| 2004/0153362 A1 | 8/2004 | Bauer | |
| 2005/0091175 A9 | 4/2005 | Farmer | |

OTHER PUBLICATIONS

Eaton, Innovation Truck, 1999 Roadranger Electronic Support Network.
Eaton VORAD, Collision Warning System, & SmartCruise, Jun. 4, 1998, World's First Look at Radar-Based Adaptive Cruise Control.
Nexiq Technologies, Inc., 2000.
Speaker Recognition, Nov. 8, 2001.
Examples of Biometric Systems, Nov. 8, 2001.
Redknee, Inc.—Fueling the adoption of new mobile services with Sun Microsystems, Enhanced location services to be used by BT Cellnet, Dynamic Data Profiling, Mobile Multimedia Gateway, Mobile Applications.
Nuance, Technical Data Sheet, Voice printing Software, Secure Access with your Voiceprint, Business case for voice authentication.
Speaker Verification, SpeechSecure.
Federal trade Commission, Dec. 11-12, 2000, The mobile wireless web, data services and beyond.
Meconomy, solutions, USA Today.
Voicevault for people, The most discreet personal security, Nov. 8, 2001.
Ensigma Tech., Speech Technology, Nov. 8, 2001.
SpeakEZ Voice print Technology.
J.D. Power Clubs Pioneers GPS Technology and Wireless Communication in E-auto Space, 2000.
Cypherpunk HyperArchive, BMW: Progressive Ins. monitoring drivers, Dec.-1999.
Qualcomm, Announces Availability of Omniexpress Mobile Communicaitons System and Signs first Major Contracts, 2000.
Eaton VORAD, Vehicle Information Management System, 2000.
Eaton Products & Services, Trucking Information Services, Satellite Communications Modules, 1999 & Radio Communications Modules, 1999 & On-Board Computers, 1999 & Fleet Advisor Jun. 15, 2000.
Track Communications, Inc., Tracking Things That Move, 2000.
SCC Communications Corp, The Next-Generation Public Safety Communications Network, Aug. 2, 2000.
Privacy and Location—based Sep.-2001.
Internet devices coming thay reveal your location, Oct. 30, 2000.
Forget about Passwords w/Biometric Technology, Forbes.com.
Cashing in on Privacy, J.Jones, Sep. 8, 2000.
Large Scale Evaluation of Automatic Speaker Verification Technology, May-2000.
Biometric Identifiers, Sep. 27, 2001.
Principals of Speaker Recognition, Nov., 9, 2001.
SpeechSecure from SpeechWorks.
Orpheus 2.0.
Art+Persay=Total Protection for Mobile Devices and m-Commerce.
Voice Verification Biometric Technologies.
Predictive Networks.
VoiceCheck Software Development Kit.
"Not the Agents of Change, p. 225, Jun. 1, 2000, Business 2.0".
Norwich Union Insurance Company, "Pay As You Drive ™", http://www.norwichunion.com/pay-as-you-drive.
Progressive Casualty Insurance Company, "Tripsense ™ Overview", www.tripsense,progressive.com.

* cited by examiner

Fig. 5

Basic Information

91 — NAME:
92 — ADDRESS
93 — Age:
94 — Sex:
95 — Other Drivers:

Types of Insurance Coverage

| | YES | NO |
|---|---|---|
| Liability | ☐ — 101 | ☐ |
| Uninsured Motorist | ☐ — 102 | ☐ |
| Comprehensive | ☐ — 103 | ☐ |
| Collision | ☐ — 104 | ☐ |

Liability Limits  100K ☐  500/500 ☐  700K ☐  500K ☐  500/1000 ☐

Deductibles ☐ — 105

Vehicle Information

96 — Type/Model:
97 — Year:
98 — Safety Equip.:

Driver Information

99 — Any Violations/Citations:
100 — Any Insurance Claims filed: — 106
107 — Driver's License #

AUTOMATED CONSUMER TO BUSINESS ELECTRONIC MARKETPLACE SYSTEM

CROSS REFERENCE TO RELATED APPLICATION

This application claims the benefit of U.S. Provisional Application No. 60/463,380 filed Apr. 16, 2003. This application also is a continuation-in-part of U.S. application Ser. No. 10/690,459 filed Oct. 20, 2003, which is a continuation of U.S. application Ser. No. 09/638,177 filed Aug. 11, 2000, now abandoned.

TECHNICAL FIELD

The present invention is related generally to a system and method for monitoring various types of information relating to the operation of vehicles, building systems, or monitoring of other personnel or environments, and reporting such information anonymously to an electronic marketplace. Based on said anonymous information, appropriate vehicle-related product and service offerings from selected suppliers are identified, analyzed, and reported back to said vehicles' owners, who can then make purchase decisions through the electronic marketplace. The invention also includes a system and method for presenting the vehicles' drivers with vehicle insurance alternatives, at the start of each vehicle operation, allowing selection of the most appropriate alternative for each trip. The invention further provides a system and method for communicating information consistent with the driver's insurance choice to the insurance company providing vehicle insurance coverage in effect at the time of the selection. The invention is also directed to providing a user with alternatives to other products or services, depending upon the environment or application, such as alternative suppliers of home or business insurance products, building systems, energy suppliers or many other similar applications.

BACKGROUND OF INVENTION

After market vehicle equipment, vehicle insurance, and other vehicle-related services are usually sought out by vehicle owners interested in such products. The owner must research the specific costs related to such products and choose the products based on their driving needs. Insurance costs are generally a result of the characteristics of a vehicle, the vehicle's drivers and their driving histories. Prices for insurance products are usually sold on a yearly basis and are determined by a profile of the drivers, their driving records, and characteristics of the vehicle at the time that the policy is purchased. Prices are a function of the drivers' genders and ages, where they live, work, and park the vehicle and the number of miles the vehicle is driven on a daily basis. All of these factors contribute to the calculation of an insurance rate for a yearly term. In most cases, the rates are not variable for changes in these conditions during the year term of the policy.

It is also a common practice for insurance companies to offer discounts on vehicle insurance premiums for a vehicle which has optional factory-installed or after market products that are believed to promote safer operation of the vehicle and/or offer greater protection for the driver and other vehicle occupants, or even the vehicle itself. Examples of such products are ABS brakes, which are believed to reduce the number and severity of accidents, and vehicle security systems, which reduce the potential for vehicle theft. In the cases of such products, the presence of the product, once properly-installed on the vehicle, is generally enough evidence to support that it will function to provide the added benefits which warrant the discount offered in vehicle insurance premiums.

Recently, some products have been introduced for vehicles, and others are being prepared for introduction, which promote safer vehicle operation, but which can be utilized at the driver's discretion. These types of products offer significant potential for improving safety, but since there is no prior knowledge or assurance of how much such products will be utilized, it is difficult to justify offering vehicle insurance premium reductions for their purchase. Examples of such products already introduced into the market are navigation systems, heavy-vehicle forward collision warning systems, and heavy-vehicle lane-change collision warning systems. Other products announced for market introduction are heavy-vehicle lane-departure warning systems, and being prepared for heavy-vehicle product introduction are drowsy- and/or inattentive-driver monitoring systems. For various reasons, such products are often introduced first for heavy vehicles for commercial use, but are expected to be also offered later for light vehicles for commercial and personal use.

As such safety-related products only function at the driver's discretion, the utilization is difficult to assess. Attempts to account for this problem have been set forth in U.S. Pat. Nos. 5,797,134 and 6,064,970, entitled "Motor Vehicle Monitoring System for Determining a Cost of Insurance". The inventions taught by these two patents provide for capturing data relating to vehicle operations and using such data to determine the appropriate vehicle insurance premium.

A problem with such an operation is found in the requirement to have the relevant data captured and reported to the insurance company's central computers. There are concerns about potential loss of privacy due to having such data captured and communicated to another party. A further problem can exist if the owner decides not to surrender that type of information from time to time, or if other people are allowed to drive his vehicle who might object to having otherwise-private information about their location and driving habits captured and transmitted to the insurance company.

In other developments relevant to the current invention, a number of insurance companies have developed Internet web sites through which consumers can provide relevant information and receive quotes for insurance policies, including automotive insurance. According to the story "Not the Agents of Change" on page 225 of the Jun. 13, 2000 issue of the magazine "Business 2.0", Progressive Casualty Insurance Company launched the first auto insurance company Website in mid 1997, and at present is receiving 630,000 unique visitors nationwide. In addition to the traditional vehicle insurers utilizing traditional agents that are now beginning to also market their products through their own web sites, at least one company has been formed without traditional agents to market its own insurance products exclusively through its Internet web site eCoverage.com (ecoverage P&C Insurance Services, Inc.).

There are now also a number of electronic marketplaces accessible as web pages through the Internet, some of which allow consumers to comparison-shop for various products and services offered to them by businesses, sometimes called "consumer-to-business" or C2B sites, since it is the consumer who takes the initiative to utilize such sites to evaluate alternative business products. The attraction of a C2B marketplace to many consumers, compared with Internet web sites belonging to a single business, is the availability of alternatives from a central, presumably neutral, source. Various protections are claimed for protecting the privacy of information provided by the consumer in order to receive an analysis of suitable alternative product or service choices.

Some existing C2B sites offer insurance products, including automotive insurance. Based on information supplied on-line by the consumer on his and other intended drivers' profiles, driving records, and vehicles to be covered, comparisons are generally made between alternative companies' vehicle insurance policies and an analysis is provided on-line to the consumer. In some cases the consumer can choose to purchase a desired insurance policy through the C2B site, and in other cases either is directed to contact an appropriate agent or has the necessary information forwarded to an agent, who in turn contacts the consumer to arrange the sale. Examples of such C2B sites offering automotive insurance and their owners are InsureMarket.com (Intuit Inc.'s Quicken Insurance site), InsWeb.com (InsWeb Corporation), Einsure.com (E-INSURE Services, Inc.), and IAC.com (Insurance Answer Center, Inc.).

At present, even considering the existing methods and systems art, a problem remains in providing automotive insurance with premiums based in part on vehicle-operation related data captured by systems on the vehicle. A vehicle's owner currently has no convenient way of selectively capturing data relating to operation of their vehicle, to identify potential savings in vehicle insurance premiums. This is a smaller problem for premiums based solely on vehicle usage, since most drivers can estimate how much a vehicle is driven, where it is generally driven, and at what times. Such information can be provided via a web site or to a traditional agent, and estimated premiums calculated. However, the potential exists for premiums to also be based on the way the car is driven, both in absolute terms (frequency of hard-braking ABS events, high accelerations, sudden swerves, etc.) and relative to other vehicles (tailgating, high-speed approaches to other vehicles), relative to the roadway (difficulty staying within lane), and/or the driver's ability to stay alert and attentive to the driving task. These types of information are easily identified and can be captured from existing ABS systems, collision warning systems, lane-keeping and road-departure warning systems, drowsy- and/or inattentive-driver monitoring systems, and the like, but such data are not generally available directly to the vehicle owner. Further, the owner's or other driver's ability to estimate such data accurately is very unlikely. For these reasons, the present art does not provide a convenient approach for capturing such relevant data and providing the vehicle owner with vehicle insurance alternatives based on the current vehicle's configuration. Likewise, the present art does not provide a convenient approach for providing the vehicle owner with vehicle insurance alternatives based on the addition of various after market vehicle products capable of capturing vehicle-operation related information which may be reported to an insurance company for vehicle insurance premium discounts.

Similarly, in other environments, such as the home or place of business, it would be advantageous to provide the ability to monitor the user or environment to allow the capture of data, which can be communicated to an electronic marketplace to calculate the cost of related products or services to the user within such an environment.

SUMMARY OF INVENTION

The present invention provides a system and a method to address these problems in the art through systems and methods which allow effective capturing of vehicle configuration and operational data for determining possible vehicle insurance premium discounts, without the associated problems noted above. The system may comprise a device for monitoring data concerning vehicle operation, driver status, and/or external environment (such as vehicle position relative to other vehicles, obstacles, other vehicles speeds, distances, accelerations, directions of travel or the like, boundaries of a lane or roadway or the like). A communication system for making such information anonymously available to an electronic marketplace is provided, and based upon the information, a system by which the electronic marketplace identifies appropriate vehicle equipment or services offered by various suppliers may be provided. The electronic marketplace communicates such analysis back to the vehicle owner, and a system by which the vehicle owner can select such vehicle equipment or services for purchase based on the communicated analysis is provided. There may also be provided a system by which a vehicle driver can select at the beginning of each trip among vehicle insurance alternatives involving the capture and reporting of various vehicle operation related data offered by the automotive insurance policy previously purchased by the vehicle owner. A similar approach may be provided for other environments, such as the home, office, other places of business or the like, where a user, other people or the environment may be monitored, data captured and products or services related to the user, others or the environment correlated and communicated in a similar fashion.

It is an object of the present invention to provide systems and methods for monitoring information about a vehicle's operation and driver status, such as usage of various equipment installed on the vehicle, frequency of hard-braking, high accelerations, ABS engagement, sudden swerves, tailgating, high-speed approaches to other vehicles, difficulty staying within lane, and the driver's state of alertness and/or attentiveness to the driving task.

It is a further object of the present invention to provide systems and methods for transmitting such data to an electronic marketplace, such as an Internet web site, without identifying or allowing the identification of the particular vehicle, its driver, or its owner.

It is another object of the present invention that such data be used for providing pricing information regarding various equipment and services judged suitable due to the vehicle's current configuration, which information is communicated to the vehicle's owner while maintaining his anonymity allowing the vehicle's owner to select equipment or services for purchase if desired.

A further object of the invention is to allow such data to be used in relation to insurance on the driver him/herself that relates to safety, or other driver characteristics, such as life insurance, disability insurance or the like.

It is another object of the present invention to allow a driver to select the features of the vehicle, driver, vehicle operation, and/or external environment which are monitored during a particular trip and made available for various analysis and reports to the vehicle owner and optionally to an insurance company for vehicle insurance purposes. All generated data can also be captured for anonymous reporting to the Web site for aggregation with other vehicles' data for statistical purposes—for insurance purposes as well as others, such as compiling overall driving safety statistics, etc?

BRIEF DESCRIPTION OF THE DRAWINGS

Other objects and advantages of the invention will become apparent upon reading the description of embodiments thereof, in conjunction with the drawings.

FIG. 5 is a diagram representative of a registration page associated with a Website or other electronic business marketplace.

DETAILED DESCRIPTION OF THE INVENTION

In the following detailed description of the preferred embodiments of the present invention, reference is made to the accompanying drawings which, in conjunction with this detailed description, illustrate and describe a system and method for vehicle monitoring. It should be recognized that the systems, methods and other aspects of the invention can also be used in other situations or environments as the vehicle monitoring system described herein, and the invention is not to be limited to any particular application or environment.

Figure 1:
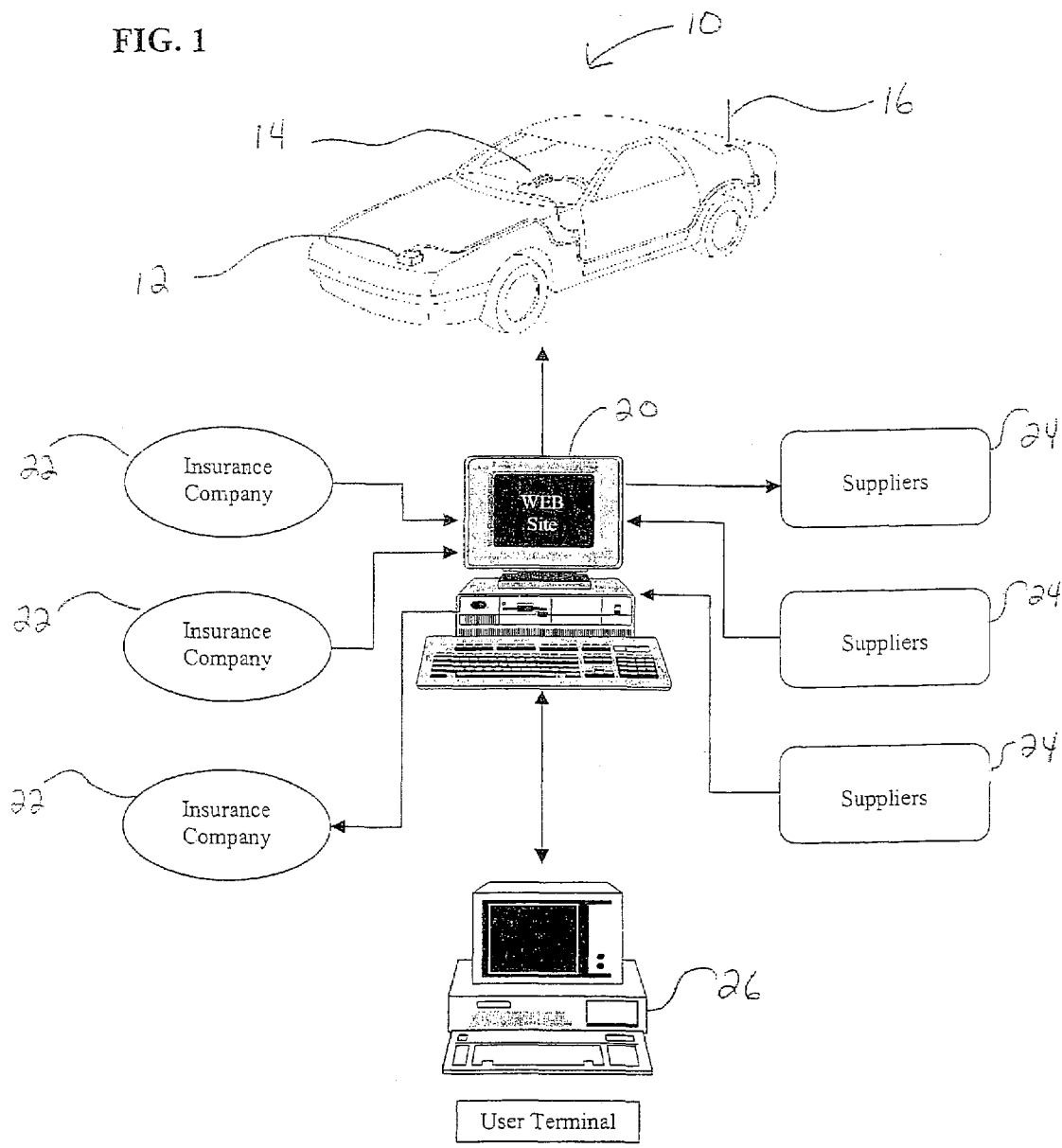
FIG. 1 is a schematic diagram of the system according to an embodiment of the present invention.

Turning now to FIG. 1, there is shown a system and method according to an embodiment of the invention, to facilitate acquisition and communication of data to and from a vehicle, providing the ability to monitor and use driving conditions of the vehicle and/or driver characteristics, to provide the basis for policy-premium adjustments related to insuring the vehicle. These adjustments could be discounts provided for electing specific monitoring options, or adjustments based on analysis of the data monitored and communicated to the insurance company providing vehicle insurance to the vehicle. While such adjustments could be discounts or surcharges based on the analysis of data captured and analyzed through the electronic marketplace for such purposes, in a preferred embodiment the data and/or their analysis are only provided to the insurance company for policy premium adjustments if a discount is available. In such cases when analysis through the electronic marketplace shows that no discount from the current vehicle insurer is available, no data would be transmitted to the insurer and the normal policy premium would be charged for the relevant period. Data is selectively communicated to and from the vehicle to allow the vehicle owner the option of providing data to insurance companies, allowing the insurance company to more accurately assess safety of operation of the vehicle or other parameters relating to insurance coverage. Such data may be anonymously provided to a central source, where it may be analyzed using criteria as set forth by various insurance companies, allowing an accurate assessment of premiums which may be available for various insurance policies. As the analysis is based upon actual driving conditions and operator characteristics, the vehicle owner may facilitate controlling insurance costs, and such information may also be used for actual purposes to provide valuable resources for evaluating characteristics of insurance coverage. The data acquired and utilized in the present invention depends in part upon what types of systems may be associated with a particular vehicle for generating desired data. Systems and devices to generate desirable data may be of a variety of different types, and may either be provided as original equipment on the vehicle, or as aftermarket products installed on the vehicle. As merely examples of systems and devices which may be useful to generate desirable data, adaptive cruise control systems, such as produced by Delphi Delco Electronics Systems, can be used to capture data relating to information sensed by a radar system, relating to vehicle operation. Similarly, vehicle collision warning systems would produce similar information useful for analysis of vehicle operation. General characteristics of vehicle operation available from other vehicle systems could also could be monitored, which may include vehicle speed, use of safety belts, braking characteristics, acceleration characteristics, miles driven, time and length of vehicle operation, initiation of ABS, airbag or other safety systems, as well as other data which may be helpful to evaluate operation of the vehicle. Further, using a system for identifying the location of vehicle, such as GPS or cellular networks, allow evaluation of the types of roads on which the vehicle is driven, where the vehicle is parked and the like, to evaluate possible risk of accident or theft. Other data which may also be desirable include data regarding the status of the vehicle operator. For example, alertness of the driver may be monitored, or other characteristics, such as cell phone use, smoking or the like. Based upon the foregoing, it should be understood that any systems or method of evaluating vehicle operation, operator status or other desirable information related to insuring the vehicle, evaluating warranty claims or insurance claims, or for other purposes, may be captured or used in accordance with the systems and method of the present invention. Thus, although the description of the embodiment herein relates to data and evaluation for purposes of insurance coverage, other uses are contemplated, and are within the scope of the invention.

In FIG. 1, an exemplary system and method will be described with reference to a single vehicle, although it should be understood that any number of vehicles can be incorporated into the system, regardless of geographic location. A vehicle 10 equipped with at least one system or device which will generate data to be captured relating to at least one of the group of vehicle operation, vehicle operator status, vehicle operator characteristics, vehicle location, times of operation/parking, other vehicles, or roadway features. A data generating system 12 is thus shown schematically as such a system or device, and may be of any variety of configurations and/or characteristics to generate any of the data as described. The at least one system 12 is coupled to a communication system 14 adapted to receive generated data, process said data if necessary, and transmit such data from the vehicle. The communication system 14 is able to transmit and receive information in any suitable format, and through any suitable communications system. In the embodiment shown, wireless communication from the vehicle 10 via the communications system 14 is provided through any suitable wireless network. Alternatively, cellular or other systems may be utilized if desired, as long as such systems provide transmission and receipt of information for purposes of the invention. As shown in FIG. 1, communication system 14 may transmit data via a transmitter 16 to a central facility, such as an electronic marketplace, for instance web site 20. The electronic marketplace site 20 may in turn be located on a computerized information network, such as the internet. The Website 20 may be operated by a wireless application service provider ("WASP"), to allow wireless communication to the site 20. In the embodiments shown, communication from system 14 to site 20 is performed anonymously to maintain privacy of the information relative to a particular vehicle owner or operation of a vehicle. Also connected to the Website 20, may be one or more insurance companies 22 and/or service or product suppliers 24, and/or information from such companies 22 or suppliers 24 may be integrated into Website 20. The Website 20 may allow a user to interface with the insurance companies 22 and/or service providers 24 through pages on site 20, or hyperlinks to other appropriate sites. The vehicle owner may also communicate with the Website via a home computer 26 or the like.

Figure 2:
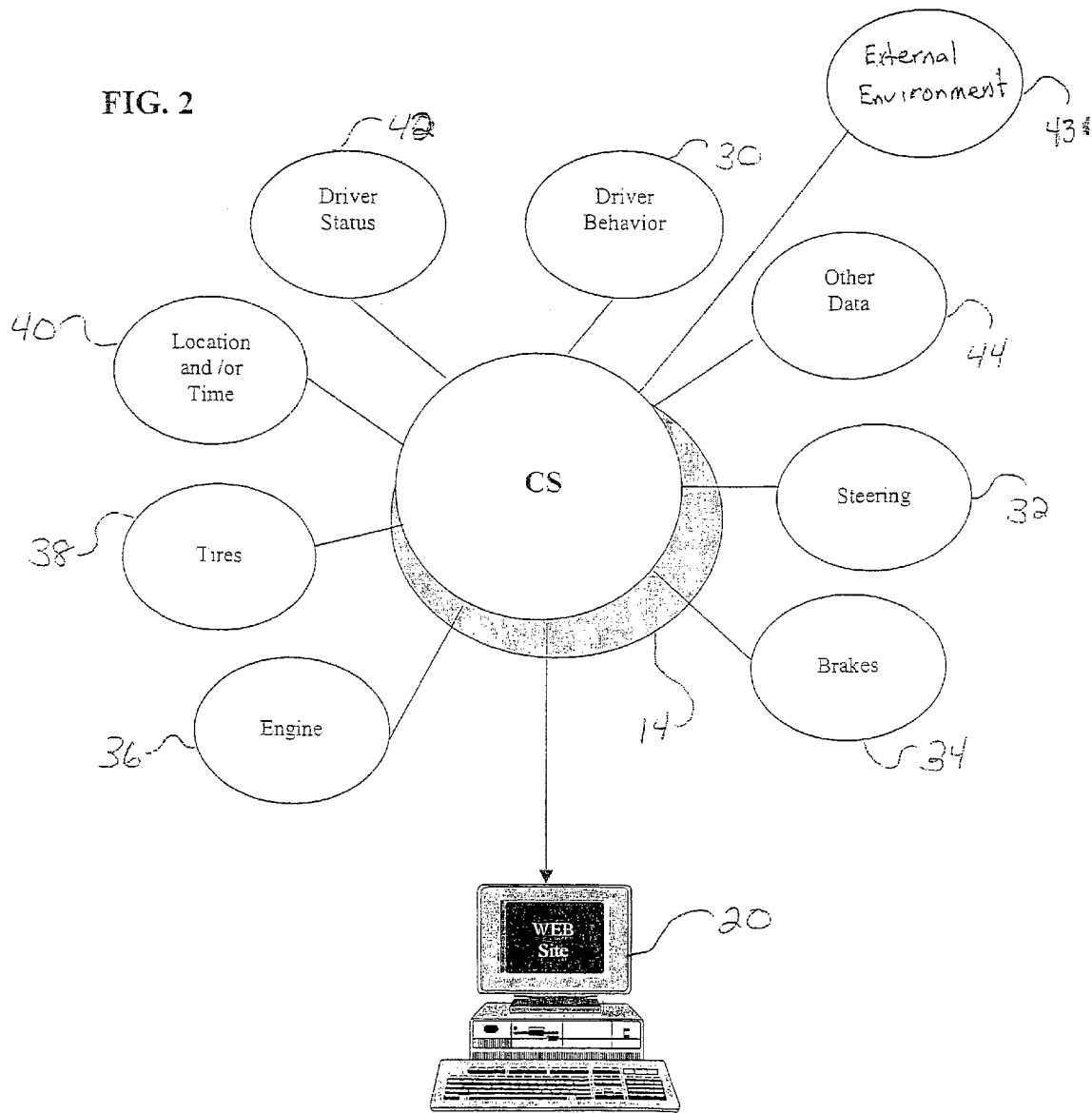
FIG. 2 is a diagram showing the acquisition of data by the communication system of the present invention.

As mentioned previously, and with reference to FIG. 2, the communication system 14 may be supplied with data generated by one or more systems or devices to monitor various aspects of the vehicle operation and/or driver status or behavior. As merely examples, the driver's behavior 30, steering function 32, brake function 34, engine function 36, tires 38, the location of the vehicle 40, the driver status 42, external environment data 43 (such as vehicle position relative to other vehicles, obstacles, other vehicles speeds, distances, accelerations, directions of travel or the like, boundaries of a lane or roadway or the like), and other data 44. External environment data may be captured by outward-looking sensors on adaptive cruise control, collision warning, lane departure warning, and other such systems.

Figure 3:
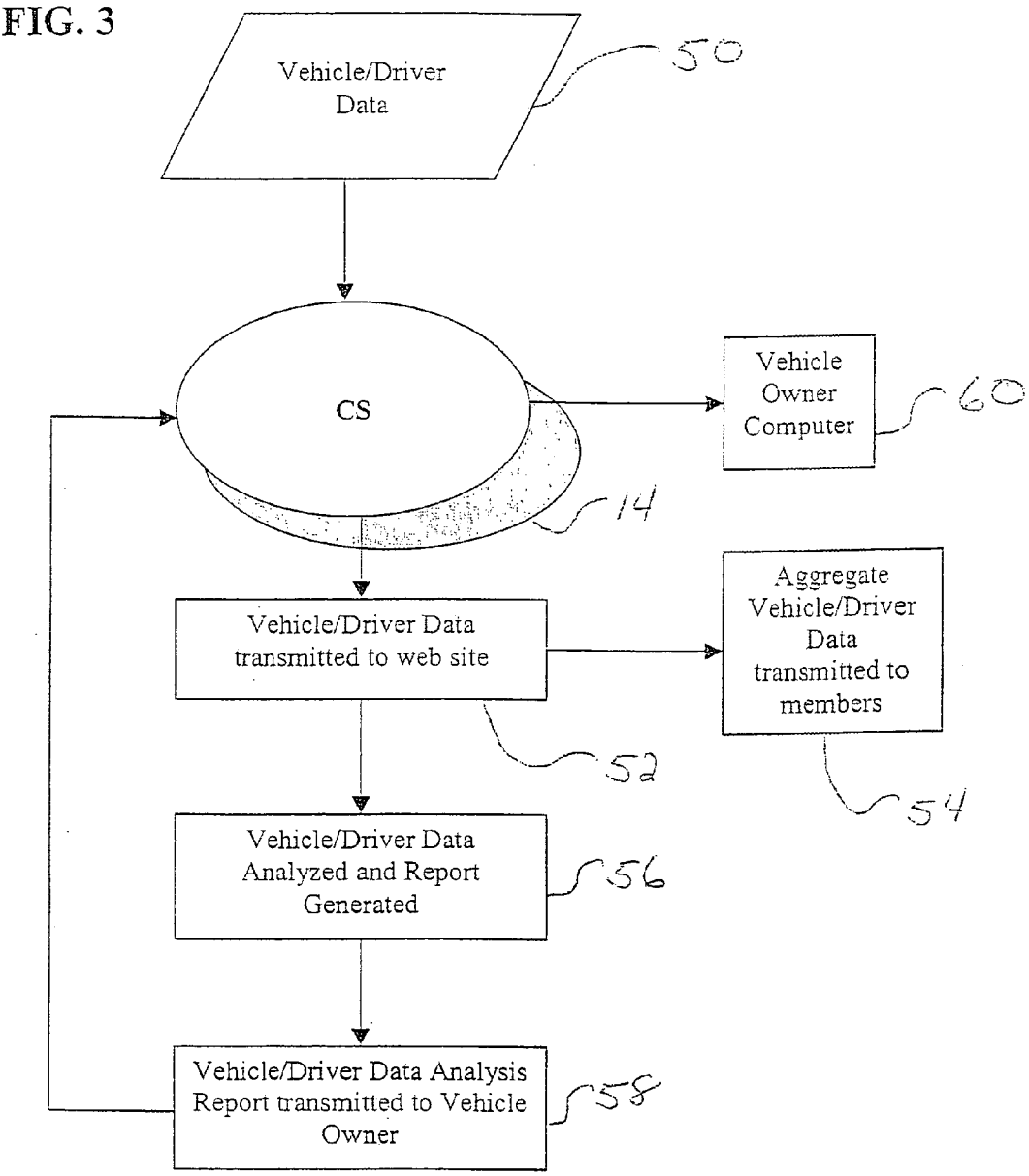
FIG. 3 is a diagram showing the system and methods according to an embodiment.

Turning now to FIG. 3, the system and methods of the invention according to this embodiment will be described in more detail. The data generated by the one or more systems relating to vehicle operation/driver status or driver behavior are aggregated as vehicle/driver data 50 and coupled to the communication system 14. This data is then transmitted to the Website 20 at 52. The vehicle/driver data may be transferred to the Website at predetermined intervals, such as weekly, and in this embodiment, such transmission is anonymous. The anonymous vehicle/drive data may then be aggregated with other such data transmitted by other vehicles, and forwarded to the member insurance companies or other organizations at 54, which may be useful for actuarial purposes or other statistical purposes. Because the data is preferably anonymous as well as aggregated, the insurance company cannot judge at this point a proposed insurance policy and premium pricing for an individual vehicle owner. The vehicle/driver data is also analyzed at 56, which in the embodiment shown is performed at the Website 20 with resident resources used in association with the Website 20. In an embodiment of the invention, the Website 20 may be provided with information from member insurance companies 22, relating to each of their calculations for proposing insurance coverage to a customer. Such analysis will include providing policy premium adjustments based upon the actual operation of the vehicle, driver status or driver behavior as determined from the vehicle/driver data. As the systems and devices which generate data for an individual vehicle may vary to a great extent, any proposed insurance coverage and analysis of the vehicle/driver data is performed specifically on the vehicle/driver data available for a particular vehicle. Alternatively, the vehicle/driver data may be forwarded or transmitted to a member insurance company 22, where an analysis of the data may be performed and returned to the Website 20. Under either embodiment, an analysis of the vehicle/driver data will allow generation of a report which will indicate to the vehicle owner information to allow the owner to potentially purchase insurance products and/or other products or services which may enhance the ability of the driver to receive discounts on their vehicle insurance. The vehicle/driver data analysis report is thus transmitted to the vehicle owner at 58, which again may be performed at predetermined timed intervals corresponding to receipt of the data. It should be understood that although transmission of the data and report is discussed as being performed at intervals, it should be understood that continuous transmission of data is possible, with reports generated accordingly. In an embodiment of the invention, the vehicle/driver data analysis report may be transmitted back to the communication system 14, still in anonymous form, and from the communication system 14 may in turn be retransmitted to the vehicle owner such as by electronic mail to the vehicle owners computer at 60. Other possible methods of communicating the vehicle/driver data analysis report to the vehicle at 58 are also contemplated. In this way, the vehicle owner will be able to review possible discounts available from one or more insurance companies based upon the actual vehicle/driver data transmitted from the communication system 14. If a vehicle owner has an existing relationship with an insurance company, the vehicle owner may desire that the vehicle/driver data analysis be forwarded to the insurance company to receive a specified discount. For example, the vehicle owner may contact the Website 20 and issue instructions that the vehicle/driver data as well as analysis report be forwarded to their insurance company.

It is also an advantage of the system and methods according to the invention that a vehicle owner can use the invention to determine what types of discounts or premiums may be available based upon actual vehicle/driver data. The system can be used without transmitting data to the insurance company, and thus the vehicle owner can selectively forward data when a discount is available, but may withhold such information if no discount would be generated. It should also be apparent, that if no discount would be available, this may indicate problems in the analysis relating to vehicle operation, driver status or driver behavior, which may motivate the vehicle owner to correct any such problems and thereby receive appropriate discounts. It is also contemplated in the invention, that the communication system 14 may be selectively operated by the vehicle driver so as to capture and transmit data only when desired. Regardless of the ability to use the system to reduce insurance costs in this application, a vehicle owner could use the system to receive driving analysis reports, indicating any unsafe operation of the vehicle or the like, to assist the driver in becoming safer and more aware of risks in driving.

The vehicle owner may maintain control over use of the systems or methods, and any such information is maintained anonymous by the Website 20.

It should also be recognized that if the vehicle owner does not have a computer or other access to electronic mail or the like, the Website may allow a user to communicate via a telephone, using an interactive voice recognition system (IVR) or the like. An IVR system will allow a user to use a touch-tone keypad as an input device for providing or receiving information to the Website.

Figure 4:
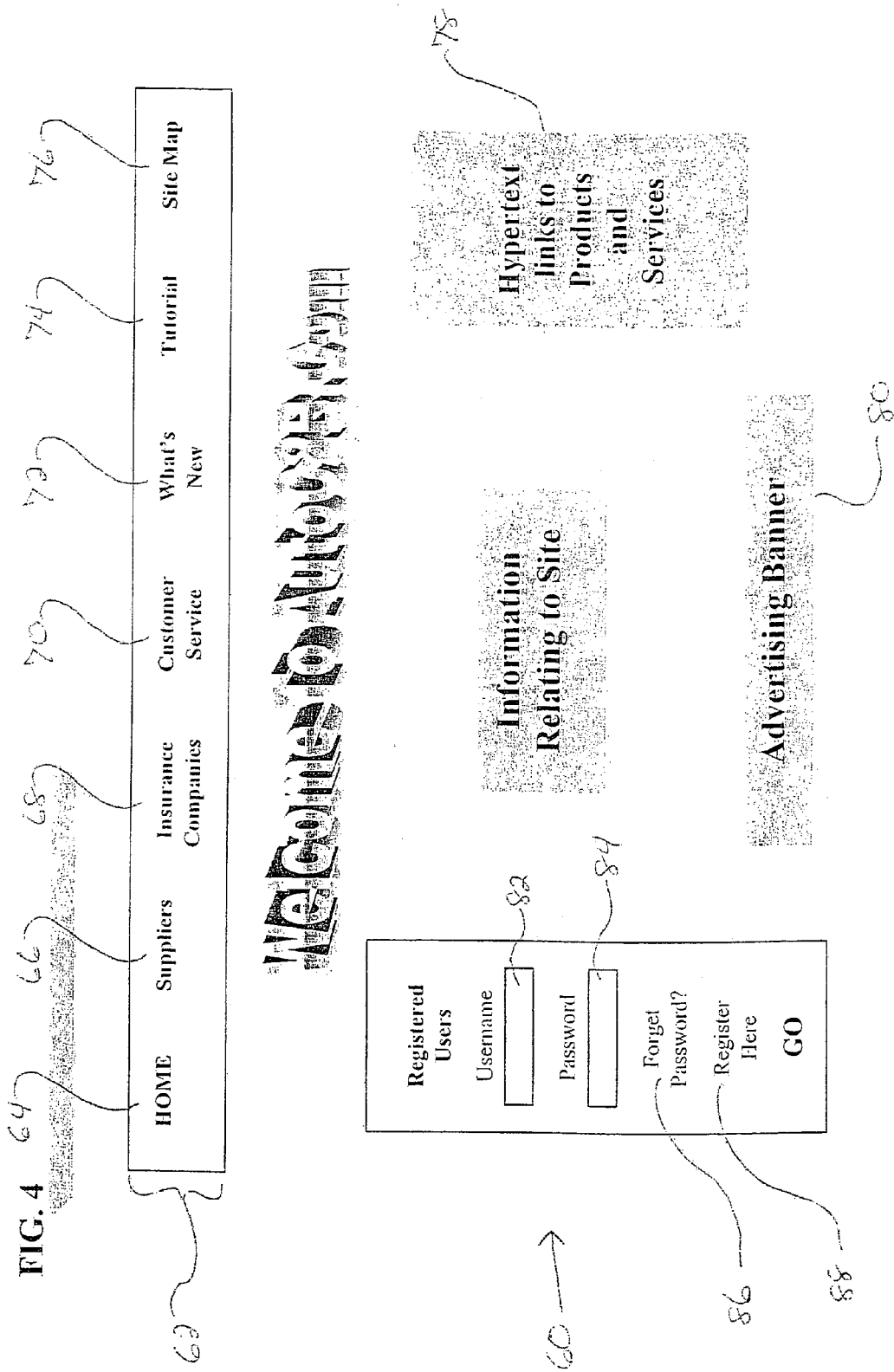
FIG. 4 is a diagram representative of a welcome page associated with a Website or other electronic business marketplace.

Also based upon a vehicle owner using the system and methods according to the invention, the Website may provide an interface for making purchase decisions with respect to insurance products, services or other products, as well as accessing other information and services provided by the Website. Turning to FIG. 4, an example of a home web page 60 may provide an initial interface with a vehicle owner or other registered user, or as the interface to a potential new user to allow registration. The page 60 may include a number of interface buttons generally depicted at 62, which increase the users efficiency in traversing the Website. The graphical interface provided by the Website may provide features in the menu bar 62, such as a home button 64 to return the user to the welcome page 60 from another location in the site. A supplier button 66 may be provided to refer the user more information regarding suppliers of products or services which may relate to the function of the Website 20. An insurance company's button 68 may similarly provide the user with additional information regarding member insurance companies. In addition, the menu bar 62 may include various general information or services to the customer, by means of a customer service button 70, a what's new button 72, a tutorial button 74 as well as a site map 76. The welcome page 60 may also include hypertext links 78 to link the user to other sites on the global information system relating to products or services which may be of interest. As with other Internet sites, advertising banners 80 or other marketing or informational material may be provided on the site. There may also be provided on the welcome page 60 an interface to allow a registered user to enter a user name and password at 82 and 84, to allow access to more particular information relating to this user. If a user forgets his or her password, a link 86 may be provided to allow the user to submit information wherein the Website will communicate the users password to allow them to access the site. For other users, a registration interface 88 may be provided, which will transfer the user to a registration page 90 as shown in FIG. 5. On the registration page 90, a user will be prompted to input various basic information, such as name 91, address 92, age 93, sex 94, other drivers 95 or any additional information which may be helpful to initially evaluate insurance products for the user. Similarly, vehicle information is also submitted by the user, which may include, but is not limited to type and model of the vehicle at 96, model year 97, safety equipment or systems or other vehicle or driver monitoring equipment 98 or any other vehicle information which may be desired. Initial registration may also request driver information, such as but not limited to violations or citations issued to a driver at 99 and any insurance claims filed at 100, and the driver license number and state at 107. The user may also be prompted to identify the types of insurance coverage which may be desired, relating to liability insurance 101, uninsured motorist insurance 102, comprehensive insurance 103, collision insurance 104, as well as liability limits desired in the insurance policy, and deductible ranges at 105 and 106. Although various information has been depicted in FIG. 5, it should be recognized that any additional information which may be desired can be obtained similarly.

Figure 6:
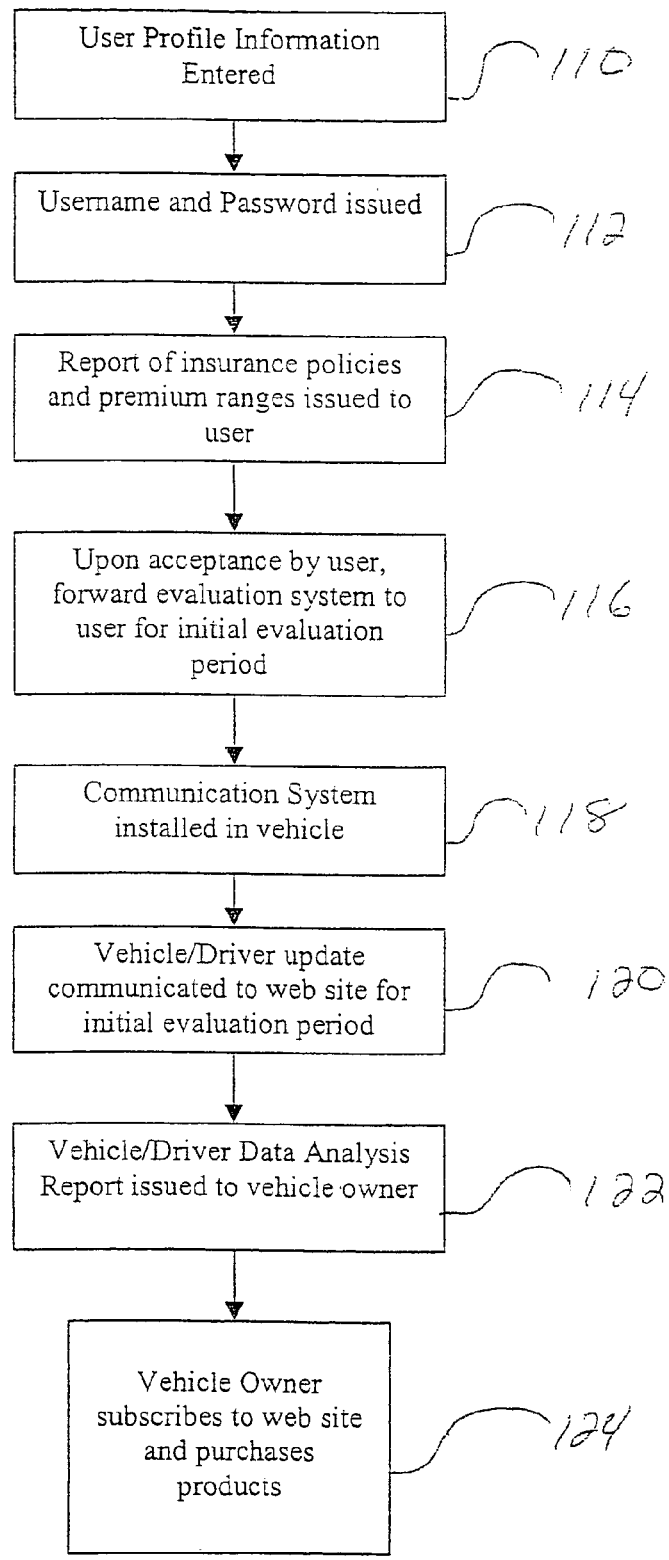
FIG. 6 is a flow diagram of the driver-operated system of one embodiment of the present invention.

In an embodiment of the invention, once the user has registered via an interface such as FIG. 5, or via an IVR system using a telephone, the user profile data will allow the Website 20 to evaluate the user generally under various member insurance company criteria. As shown in FIG. 6, once user profile information is entered at 110, a user name and password may be issued at 112. Based upon the user profile information entered, a report of insurance policies and premium ranges based upon the information may be issued to the user at 114. Upon acceptance by the user, an evaluation system may be forwarded to the user an initial evaluation period at 116, which will allow a user to evaluate the system and its potential advantages without any commitment. As at least a part of the evaluation system, a communication system will be installed in the vehicle at 118 to allow transmission of the vehicle/driver data to the Website as previously described. At 120, the vehicle/driver data is communicated to the Website for the initial evaluation period, and a vehicle/driver data analysis report issued to the vehicle owner at 122. Again, the report issued at 122, will allow the user to evaluate particular discounts which may be available based upon particular data generating systems or products installed in their vehicle, such as adaptive cruise control, collision warning systems, collision avoidance systems, lane changing warning systems, GPS systems, a driver alertness monitor, or any other systems or products as previously mentioned. Based upon the vehicle/driver data analysis report issued at 122, the vehicle owner may then subscribe to the Website and purchase additional products which may provide other discounts accordingly at 124. Upon subscribing to the system, operation of the system with respect to this particular vehicle owner commences as previously described. Also, due to the anonymous nature of the communication to/from the vehicle owner and supplier(s), the supplier(s) could perform market research activities through the user interface.

As previously mentioned, the communication system of the invention may also be configured by the user to allow predetermined reporting options for a particular use of the vehicle. The CS 14 may be configured to show the reporting options selected from the previous trip and use these as defaults, or may default to full privacy or any other reporting option configured by the driver. The CU display unit preferably includes a user interface mechanism such as a touch screen or keyboard by which a driver can select specified options for a current trip. The system may offer various levels of reporting, for instance, the driver may choose to have full privacy and have no information reported for a current trip. In the alternative, the driver may choose to have specific aspects of the information reported and keep others private. For instance, the driver may choose to have location monitored and reported, while keeping the visual driver monitor private. For instance, the driver may choose to have location monitored and reported, while keeping the visual driver monitor private. Upon starting the vehicle, the driver may have a specified time interval in which to change the reporting options, or else the CS 14 reverts to the default options. A display unit may show the driver choices for reporting and near each choice, a percentage discount which is available for each reporting option may be shown. For example, suppose that the driver's current insurance policy rate is $100/month. On a particular trip the display unit shows potential discounts of 5% for location reporting, a 2% for driver state reporting, and a 3% for vehicle operation reporting. The driver can select the options he wishes to use for that particular trip, through the user interface. The CS monitors overall relevant data for the trip and transmits those to the web site 20. Based on the driver's selection, only data related to the selections made for that trip are made available for reports to the vehicle owner and/or insurance company currently providing vehicle insurance for vehicle 10. However, all available data may be provided anonymously and aggregated for use by member insurance companies 22 or other organizations for statistical purposes.

As another alternative, the CS 14, if supplied with data from GPS equipment, may be used to monitor the vehicle's location on a particular path. The present system may use the GPS link with the CS to notify the driver of any unusual objects in a path. For example, the CS may be able to alert a driver using an audio or visual signal able of an object such as a fallen tree blocking the road ahead. Additionally, the CS may be able to provide the driver with more specific information, for example, may alert the driver that the fallen tree is 500 feet ahead. Further, another potential function may allow the CS to use the driver's current speed and road conditions to calculate the distance from the object which the driver needs to begin braking in order to stop safely. The driver may be notified by a signal such as "BEGIN BRAKING NOW" or a similar command. Further, the communication of this information to the electronic marketplace will allow insurance companies to adjust policy rates accordingly if the driver consistently travels on a very safe or very dangerous path. Additionally, suppliers may offer various safety products based on conditions usually encountered by the vehicle.

Further, the CU may include systems for monitoring driver behavior, such as auditory, visual, odor or other monitoring of the driver, vehicle environment or external environment. The monitoring can record the driver's behavior when operating the vehicle. Thus for example, unsafe driving practices can be reported. However, other safety benefits can be gained from such a system. For example, if a driver becomes fatigued and starts to fall asleep while driving, the CU may issue an audible warning to awaken the driver to avert danger.

In addition, the CU monitoring of various vehicle systems may serve to alert the driver of potential maintenance problems. For example, if the vehicle has worn brake pads, the communication of this information to the electronic marketplace allows various product and service suppliers to alert the driver of prices for the purchase and/or installation of new brake pads. This example is not intended to limit the scope of the invention in any way. It is contemplated that this feature of the present invention could apply to any maintenance related products or services.

In the present invention, the driver may also be offered products or services based on information provided anonymously to various suppliers. The driver may request to view this information or the display unit may be configured to ask the driver whether he would like to view such information on a periodic basis. This information may be sent back to the vehicle's CS or transmitted electronically to a location specified by the driver.

The CU display unit may include a user interface mechanism such as a touch screen or keyboard by which a driver can select specified options for a current trip. The system may offer various levels of reporting, for instance, the driver may choose to have full privacy and have no information reported for a current trip. In the alternative, the driver may choose to have specific aspects of the vehicle reported and keep others private.

In the present invention, the driver may also be offered products or services based on information provided anonymously to various suppliers. The driver may request to view this information or the display unit may be configured to ask the driver whether he would like to view such information on a periodic basis. This information may be sent back to the vehicle's CS or transmitted electronically to a location specified by the driver.

It is further contemplated by the present invention that the CS may offer other services and features valuable to the driver. For example, the CS may have a timing device. Near a driver's mealtime, the CS may indicate this fact to a driver and based on the driver's location also indicate places where the driver may eat, such as restaurants. The indicator may first divide the available options by category, such as fast food, full service, etc. and then show specific restaurants in the chosen category. The CS may further provide specific food items at a particular location chosen by the driver. By way of another example, on lengthy trips, the CS may be supplied with data from a drive monitor to note the driver's behavior and indicate nearby lodgings if the driver appears fatigued or if nighttime is approaching and the driver has been driving for an extended period.

In addition, the CU monitoring of various vehicle systems may serve to alert the driver of potential maintenance problems. For example, if the vehicle has worn brake pads, the communication of this information to the electronic marketplace allows various product and service suppliers to alert the driver of prices for the purchase and/or installation of new brake pads. This example is not intended to limit the scope of the invention in any way. It is contemplated that this feature of the present invention could apply to any maintenance related products or services.

There are studies underway in the industry that evaluate the effects of collision warning systems and/or adaptive cruise control systems on drivers, usually conducted with the cooperation of commercial trucking fleets and commercially-available collision warning and/or adaptive cruise control products, such as the Eaton VORAD collision warning and adaptive cruise control products (EVT-200 and EVT-300 models). The approach used in many cases is to install the collision warning system on a vehicle but initially not have the driver display unit (DDU) functioning. Then, during some "baseline" period, the system captures the driving behavior exhibited by the driver and since no alerts or warnings of any type are being provided to the driver by the system during the baseline period, such captured data is used to represent the normal driving habits of that particular driver. Then, after the baseline period ends, the DDU is made to function normally, giving various types of collision warning alerts to the driver as governed by the logic within the collision warning and/or adaptive cruise control system. In the case of the Eaton VORAD systems, for example some EVT-300 systems which were installed at the factory also have the ability to operate as adaptive cruise control systems, which function is trademarked "SmartCruise" by Eaton VORAD. After the DDU and (in cases where it exists) the SmartCruise function are "turned on", the same driver's driving habits are captured for some "CWS-active" period. By analyzing not only each individual driver's altered driving behavior, but also that of various groups of drivers (long-haul, short-haul, etc.), results are then reported on the usual effects on driver behavior of having such collision warning/adaptive cruise control systems installed on the types of vehicles driven in the study.

In the present invention, the above can be used to provide the following method to provide information to drivers considering the purchase of vehicle insurance whose premiums are adjusted based on driving behavior, as determined through analysis of captured data from the vehicle. (Two issued U.S. patents assigned to Progressive Insurance Company describe a method which provides such adjustments to the vehicle insurance premiums.) The present invention can provide a benefit to customers who wish to evaluate the possible advantages of such vehicle insurance whose premiums are adjusted based on captured vehicle data, who have not yet purchased particular equipment that would, if on the vehicle, be able to provide the type of vehicle data on which insurance premium adjustments could be based. For example, a truck fleet interested in heavy vehicle insurance offering discounts for allowing data to be captured from a collision warning system, such as the EVT-300, would have difficulty, if the fleet does not yet have such systems installed on its vehicles, due to the fact that the collision warning system is relatively expensive and its installation and/or removal requires a number of labor hours and expense. As a result, there is a "chicken and egg" problem—if the fleet had collision warning systems installed on its trucks, then the present invention allows estimates to be provided to the fleet owners of likely insurance premiums, based on the captured data from the vehicles. However, because insurance companies have not yet started offering such insurance that adjusts premiums based on captured data, it is usually the case that only self-insured truck fleets have purchased collision warning systems, since they benefit directly and immediately from the improved safety, lower accident rates, and resulting lower costs. Other fleets which are not self insured (the vast majority of North American truck fleets are not), however, have seldom purchased the collision warning system, at least in part due to the fact that no insurance premium discounts are offered until their accident experience improves, and then it is uncertain when and how much the discount will be. As a result of this uncertainty and delay of any financial return, there is little incentive to purchase such collision warning systems. So the result is that the truck fleets that would benefit from insurance based on a model such as set forth in the Progressive patents do not already have collision warning systems installed, and the fleets that have them installed are mostly self-insured fleets, which are already benefiting from the lower accident rates and will see no further financial benefit from the Progressive-type insurance (since they are self-insured).

To address this "chicken and egg" issue, the present invention provides a method to alleviate this problem. For convenience, a Class 8 heavy truck is used in the following embodiment as an example, and components of an Eaton VORAD EVT-300 Collision Warning System are also used. Any type vehicle and any type collision warning or adaptive cruise control system utilizing forward-looking sensors with radar, laser, or other technologies are contemplated as alternative embodiments.

For a Class 8 heavy truck with no collision warning system yet installed, but whose owners wish to evaluate potential advantages of Progressive-type vehicle insurance (per their U.S.-patented inventions) with the present invention as previously described, the following steps are taken:

1) Offer the following evaluation program to the owner of a Class 8 truck which has no collision warning systems currently installed, on a free or low-cost basis during the evaluation period.
2) Attach an EVT-300 "smart sensor" Antenna Assembly as instructed by the Eaton VORAD EVT-300 installation instructions, to the front of the truck.
3) Do not install the EVT-300 Central Processing Unit or any other components of the EVT-300 system.
4) Mount the device according to the present invention in the truck as described to provide services to the truck owner.
5) Attach a cable between the device mounted in step 4 and the smart sensor, such cable having been designed to fit the connectors on the EVT-300 smart sensor and the connector designed into the in-vehicle device for that purpose. Instructions for modifying a standard cable and standard connectors to function properly with the smart sensor are given in the EVT-300 VORAD Serial bus (VBUS) Specification, Abridged, dated Jan. 9, 1999.
6) Have driver operate the vehicle with the in-vehicle device operating, which will in turn power the EVT-300 smart sensor and cause it to operate normally, as if it were communicating with the EVT-300 Central Processing Unit. Software commands to accomplish such operations are given in the EVT-300 VORAD Serial bus (VBUS) Specification, Abridged, dated Jan. 9, 1999.
7) Data are captured and communicated to the central location as described in the present invention.
8) However, since the captured data describe the driver's normal driving habits rather than his/her driving habits with the benefit of collision warning alerts and/or adaptive cruise control operation (as would be the case in the invention described previously, the results provided to the truck owner for each insurance company's "Progressive-style" insurance basing discounts on captured driving information are the following:
    Monthly insurance premium adjustment based on driving as described by captured data, without benefit of collision warning system alerts or adaptive cruise control operation
    Based on results of industry analyses from studies such as those described above, for changes in driver behavior from "baseline" with no collision warning alerts, to "CWS-active" experience with full EVT-300 collision warning system installed and DDU activated, an estimate is provided of the changes that would likely be experienced in driver behavior with such full system installed, as well as an estimate of the insurance premium adjustment that would apply to such changed driving behavior
    Similarly, based on similar industry analyses for changes in driving behavior between "baseline" and "SmartCruise-onboard-and-available" driving periods, an estimate is provided of the changes that would likely be experienced in driver behavior from the "baseline" period to driving with both collision warning activated and SmartCruise active and available whenever the driver chooses cruise control, as well as an estimate of the insurance premium adjustment that would apply to such changed driving behavior.
9) Then the truck owner has three choices:
    1) Decline all insurance alternatives identified, and have the evaluation system components removed from the truck and returned to its owner, in which case there is no charge if a free evaluation was provided, or there is whatever small charge that was agreed upon before the evaluation period, if that was the arrangement.
    2) Choose one of the insurance alternatives which does not include having a full EVT-300 collision warning system installed, and leave the hardware already installed on the truck for the evaluation in place. It will then perform to capture driving information about the vehicle, as described in the embodiments of the present invention, but the driver will not receive any collision warning alerts nor any adaptive cruise control operation.
    3) Choose one of the insurance alternatives which does include having a full EVT-300 collision warning system installed, leave the hardware already installed on the vehicle, but purchase and have installed the additional components desired for the EVT-300 collision warning system (most likely from the normal distribution channels for the EVT-300 systems, unless other arrangements are made between Eaton VORAD and the provider of the service described herein). The in-vehicle device will then capture and provide vehicle data according to the embodiments of the present invention as previously described.

It is believed that this approach can solve the "chicken and egg" situation described above, which would otherwise be expected to inhibit the consideration of the types of insurance described in Progressive Insurance's U.S. patents, as well as inhibit the effective use of the present invention as previously described. This is largely due to the fact that, as opposed to the complete EVT-300 and other similar systems, the retrofit installation of the forward-looking "smart sensor" is significantly less expensive and labor intensive than installing the complete EVT-300 system, making it more cost-feasible to offer the alternatives described above. In addition, the insight that the Progressive-type insurance could offer advantages even to truck fleets that do not wish to have actual collision warning alerts and/or adaptive cruise control provided to their drivers, with only the "smart sensor" installed. Finally, since the normal distribution channel for EVT-300 systems is through the heavy vehicle OEM dealers, then smart sensors would be available for purchase from them; however, since the installed equipment is not providing collision warning functionality, it may be possible that direct purchases of the smart sensors from Eaton VORAD would be permitted under their distribution agreements with the heavy truck OEM companies (who may have exclusive rights to sell complete EVT-300 systems, but may not have exclusive rights to sell individual components that are not being used to replace components in a full collision warning system, or even to build up full collision warning systems for sale).

In further aspects of the invention, there are also provided systems to facilitate safe operation of a vehicle. In this regard, the following concepts are provided.

1) Driver Interface for Advanced Driver Assistance System (ADAS)

1) The concept is to use a touch-screen display, with the provision that the driver acknowledge having received an alert by touching the screen. The screen will be positioned very close to the driver's normal line-of-sight while driving, both so that visual alerts can be easily and quickly seen with minimal driver distraction, and so that the act of reaching and touching the display likewise requires minimal effort and potential distraction. A combination of audible and visual display options are planned, with the common response required by the driver of reaching and touching the display to acknowledge receipt of the alert.

2) One preferred embodiment would have the alert continue while the situation generating the alert is present, even if the driver acknowledges it by touching the screen, but would alter the alert in some way after such acknowledgement. For example, identification of a stationary object believed to be in the vehicle's path and earlier than a collision warning system will generate its own alert, a tone and a flashing icon showing the rear view of a car in red would be generated. If the driver does not acknowledge the alert, it proceeds to another level of alert, and so forth, until such time as the alert is no longer appropriate (either the situation has passed or an associated collision warning system begins giving its own alert). However, with the driver's acknowledgement by touching the screen, the alert changes to a non-flashing icon with no associated audible alert.

3) This is especially appropriate for "situation awareness" alerts that may not necessarily involve danger, but at least indicate unusual situations ahead about which the driver should be aware. Information regarding a system for providing "situation awareness" and other aspects is set forth in the applicants co-pending U.S. patent application Ser. No. 09/633,127 and pending provisional Ser. No. 60/337,827, which is hereby incorporated by reference. If there is danger, then the drive can immediately start taking action by steering, brake, and/or accelerator actions. Upon detection of any of these actions, the system will also modify its alert strategy, with a preferred embodiment being similar to that from the driver acknowledging receipt by touching the display, i.e. that audible alerts will be suppressed and any visual icons will be non-flashing. In all cases, an indication that the driver is aware of the situation is used to remove potential distractions like audible alerts and flashing displays, to minimize potential distractions to the driver when immediate attention may be needed to take action due to the detected situation. At the same time, lacking an indication that the alert has been noticed, the system can proceed with an alert strategy intended to help assure that the driver is aware of the alert, even if no action is taken about it.

4) In the case of alerts that do not involve actual danger, this approach of "silencing" the alert with a simple touch of the display should minimize any potential "false alarm" issues that the driver might otherwise develop. This is based on the idea that the simple act of touching a display within easy view and reach is preferable to hearing and seeing alerts for a greater period of time that are apply only to "nice to know" situations, rather than dangerous ones. An example is that of a vehicle that is parked in an adjacent emergency lane ahead, but which does not pose a potential collision threat unless someone at the vehicle steps into the active lanes.

Regarding 1) Driver Interface for Advanced Driver Assistance System (ADAS), a slightly different implementation is to substitute a touch pad for driver acknowledgements that is separate from the display, with the functionality the same as earlier described. This would permit easier driver interaction in the case that the optimal position for the display to be mounted is not convenient for the driver to reach, such as requiring the driver to lean forward. The touch pad would be mounted closer to the driver, perhaps on the dash very near the steering wheel but somewhat off to the side, where it can be easily reached by a momentary action of removing one hand from the steering wheel and tapping the touch pad on the upper surface of the dash nearby, and then resuming the normal driving position of the hand back on the steering wheel.

2) Implementation of Stop-and-Go Adaptive Cruise Control Using Road Geometry Database The concept of stop-and-go ACC is well understood in the Intelligent Transportation Systems industry, including the use of road geometry databases combined with accurate vehicle positioning. However, the following implementation provides enhancements to this.

The vehicle would need the following: a) an adaptive cruise control system, with the forward-looking sensor most likely utilizing radar (although a laser or other sensors may be used); b) a vehicle positioning capability, in which higher degrees of accuracy will provide better performance; and c) a road-geometry database containing so-called "extended data" (the phrase used in the European IN-ARTE program, in which Navigation Technologies was a participant).

There are several levels of operation contemplated, comprising a) non-ACC warning only; b) stop-and-go ACC'; and c) enhanced stop-and-go ACC. They are as follows. In ALL cases, the driver is charged with the ultimate responsibility for maintaining safe operation of the vehicle, and can override any active system with accelerator and/or brake activation.

a) Non-ACC Warning Only

While driving, the vehicle operator is given "in-vehicle signing" types of alerts about: current and up-coming road attributes such as speed limits, stop signs, intersections (especially if real-time information is available to identify the status of signalized intersections when the vehicle will likely arrive there) and exceptions to those conditions such as exceeding speed limit, speed too fast for present or upcoming road conditions (curves, fog, icy patches, slower speed limit ahead, planned exist ahead, etc.). (NOTE: In addition to early alerts due to detected stationary objects and/or slow-moving vehicles, I also plan to offer these types of alerts to the driver with the ROADRisk(TM) Early Alert System, as we recently discussed.)

b) Stop-and-Go ACC

This implementation goes beyond "standard" ACC that responds only to moving vehicles to maintain appropriate following distances, while cutting out at low speeds (generally when conventional cruise control would), and utilizing very limited deceleration capabilities of the vehicle. Stop-and-Go ACC, on the other hand, takes into account stationary objects in the vehicle's path as well as moving vehicles, and continues to operate all the way down to a complete stop. Then, when traffic ahead permits, it starts the vehicle moving again, but keeps it positioned away from the closest object ahead. It may not have full deceleration capability, however, and instead might alert the driver if such a situation presents itself (perhaps in addition to exerting the maximum deceleration authority that it has). (Note: A system with full emergency-braking authority is classified as a collision avoidance system.)

c) Enhanced Stop-and-Go ACC

This system performs like Stop-and-Go ACC, but with the following enhancements. The basic concept is that it takes into account the vehicle's position and the enhanced-data road geometry database to be aware of the current speed limit, upcoming speed limit, upcoming curves, upcoming intersections, and upcoming stop signs (as well as other dynamic attributes, if available, such as visual conditions like rain or fog, road conditions like ice, etc.).

With that knowledge, the vehicle's ACC set speed is adjusted and/or braking is utilized (if adjustments to the ACC set speed would not suffice) in order to: 1) slow the vehicle and bring it to a complete stop at a stop sign; 2) slow the vehicle temporarily as appropriate when approaching curves, planned highway exits, etc.; 3) slow the vehicle appropriately while under non-ideal driving conditions such as heavy rain, fog, snow, icy road surface, etc.; 4) alert the driver when approaching a signalized intersection and decrease speed somewhat, until the intersection is passed; and 5) begin slowing and come to a stop at a signalized intersection where a known route plan shows that a turn is planned (and activate in advance the appropriate turn signal, if possible).

Since the driver is always able to overrule the ACC system (whether ACC, Stop-and-Go ACC, or Enhanced Stop-and-Go ACC), the driver's involvement in the above situations is: 1) starting off again from a stop sign; 2) allowing the system to slow the vehicle in these situations, or simply overriding by using the accelerator (which may be appropriate for lane changes, change in plans where to exit, etc.); 3) allowing the system to slow the vehicle in these situations, or simply overriding by using the accelerator (which may be appropriate for passing purposes, mistaken road condition reports, etc.); 4) look ahead to the intersection and begin braking if needed to turn or stop due to the signal turning yellow or red; and 5) look ahead to the intersection and take command of the vehicle with accelerator or brake pedal activation, either of which turns control over to the driver until the intersection is passed, or else simply allow the vehicle to come to a stop (with the turn signal activated automatically, if possible) before taking responsibility for accelerating and turning when appropriate.

All of these concepts can be incorporated into the system, which may be referred to product, the ROADRisk(TM) Early Alert System, designed for heavy vehicles and targeted to those with Eaton VORAD Collision Warning Systems, with optional ADAS-type functionality using road geometry data files with extended data describing speed limits, stop sign and traffic signal locations, etc., and which will optionally use real-time updates about roadway conditions available through wireless connections to the vehicle.

Regarding 2) Implementation of Stop-and-Go Adaptive Cruise Control Using Road Geometry Database, another implementation of c) Enhanced Stop-and-Go ACC with respect to signalized intersections is to have the vehicle not only slow, but also come gradually to a stop just short of the intersection if the driver does not take actions to assume responsibility for driving through the intersection. Just as described previously, by using the accelerator and/or the brake, the driver takes control of the vehicle and stops as he/she wishes, drives through the intersection at whatever speed the driver feels appropriate, or turns at the intersection. Once past the intersection, the system will resume its operation unless the driver continues to utilize the accelerator and/or brake to override the system. This implementation is less convenient to the driver, but has the added fail-safe protection that if the driver takes no action, the vehicle will not risk driving through the signalized intersection when the signal status would recommend otherwise (red and in some cases yellow).

In an alternative embodiment, the systems and methods of the invention may be used in differing applications or environments. As merely another example of this, as with the vehicle monitoring environment described above, the invention may be applicable to monitor home or building systems and operation. In such an application, for example to monitor power usage in a facility, a communications unit can be installed to monitor at least one data element relating to power usage, for example use of electricity or natural gas at the facility. Information relating to the at least one data element can then be communicated to an electronic marketplace, and based upon the at least one data element, correlation can be made to at least one product or service, and the cost thereof, which may be of interest to the user. Information relating to the product or service can then be communicated to the user and/or the at least one supplier for similar purposes of tailoring a good or service to a user and the particular environment. In the example of monitoring power usage, the information relating to total usage, times of usage, types of uses, or other information relating to a particular users circumstances and environment can be monitored and correlated to products or services which may be of interest. As power companies in many locations are being deregulated, alternative vendors or suppliers of alternative energy sources may be interested in offering discounts based upon a particular customers usage patterns and needs, similar to the vehicle monitoring embodiment described above. All the same aspects of the invention as decried herein may be useful for this or other users or environments. For example, similar to power usage, such systems and methods may be used to monitor other systems, such as heating-A/C systems, security systems or any other application where information is captured and communicated according to the invention.

Although the present invention is described above in detail, the same is by way of illustration and example only and is not to be taken as a limitation on the present invention.

What is claimed is:

1. A method of offering products or services to a vehicle owner comprising the steps of providing a supplier database in an electronic marketplace, said supplier database comprising at least one supplier;
monitoring at least one data element selected from the group consisting of an operating state of a vehicle, status of the driver, external environment of the vehicle, location of vehicle, an action of said driver or combinations thereof;
selectively transmitting said at least one data element to an electronic marketplace;
correlating said at least one data element to at least one supplier found in said supplier database;
calculating at least a cost of at least one related product or service using said at least one data element and generating information related to said product or service, and communicating said information to said vehicle owner or said at least one supplier.

2. The method of claim 1, further comprising the step of the at least one supplier offering said at least one product or service at said cost to said driver through said electronic marketplace.

3. The method of claim 1, wherein data related to the external environment is captured by a system selected from the group consisting of adaptive cruise control, collision warning, lane departure warning, radar, video or combinations thereof.

4. The method of claim 1, wherein said at least one data element is selected from the group consisting of GPS location data, cellular location data, driver alertness, driver monitoring, function of mechanical vehicle systems, function of electrical vehicle systems, and tire condition.

5. The method of claim 1, wherein said step of calculating is performed by a system within said electronic marketplace.

6. The method of claim 1, wherein said step of calculating is performed by said at least one supplier, with said at least one data element communicated to said at least one supplier.

7. The method of claim 1, further comprising the step of recording said at least one data element in a computer readable storage medium to create a database of said data elements.

8. The method of claim 1, wherein the step of transmitting said at least one data element is selectively implemented by the vehicle driver.

9. The method of claim 1, further comprising the step of transmitting selected transmitting selected portions of said data and selected portions of said information to said at least one supplier.

10. The method of claim 1, wherein the step of transmitting comprises transmitting all data to said electronic marketplace and said step of communicating relates to only selected portions of said information.

11. The method of claim 1, further comprising the step of transmitting all portions of said data to said electronic marketplace for creating an aggregated database.

12. The method of claim 11, wherein the step of transmitting all portions of said data is performed anonymously.

13. The method of claim 1, wherein the step of offering said at least one related product or service at said calculated cost to said vehicle owner is performed anonymously.

14. The method of claim 1 further comprising the step of aggregating said at least one data element and said information to generate anonymous information relating to vehicle and driver status and operation.

15. The method of claim 1, wherein the step of transmitting said at least one data element is performed anonymously.

16. The method of claim 1 wherein said at least one automobile related product or service is selected from the group consisting of vehicle insurance, life insurance, disability insurance or combinations thereof.

17. The method of claim 1, wherein the step of calculating utilizes analysis of said at least one data element under guidelines provided by said at least one supplier.

18. The method of claim 1, further comprising the step of communicating information relating to said at least one data element to said vehicle owner.

19. The method of claim 1, further comprising the step of providing a communications system in a vehicle, wherein said step of communicating uses said communications system.

20. The method of claim 18, further comprising the step of providing a communications system in a vehicle, wherein said step of communicating information relating to said at least one data element uses said communications system.

21. The method of claim 20, wherein the step of communicating includes warning the vehicle driver of unsafe operation of said vehicle.

22. The method of claim 20, wherein the step of communicating includes information relating to the maintenance status of vehicle systems.

23. The method of claim 19, wherein said at least one data element includes vehicle location information, and said step of communicating comprises communicating information on a product or service based upon the location of said vehicle.

24. A method of monitoring operation of a vehicle or its driver comprising the steps of communicating at least one data element from at least one data generating system associated with said vehicle to a service provider, said at least one data element selected from the group consisting of an operating state of a vehicle, status of the driver, location of vehicle, an action of said driver during a selected period, external environment or communications thereof;
generating information relating to an operating state of a vehicle, the status of the driver, location of vehicle or an action of said driver during a selected period and communicating said information to the owner of said vehicle.

25. The method of claim 24 wherein said step of transmitting said at least one data element from said communications unit to said service provider is anonymous.

26. The method of claim 24 further comprising the steps of providing a supplier database in an electronic marketplace, said supplier database comprising at least one supplier;
correlating said at least one data element to said at least one supplier, wherein said at least one data element is used to calculate a cost of at least one automobile related product or service offered by said at least one supplier; and
offering said at least one product or service at said cost to said vehicle owner.

27. A method of offering insurance products to a vehicle owner comprising the steps of communicating at least one data element from at least one data generating system associated with said vehicle to an electronic marketplace, said at least one data element selected from the group consisting of an operating state of a vehicle, status of the driver, location of vehicle or an action of said driver during a selected period, external environment or combinations thereof;
  wherein said at least one data element is used to analyze projected insurance premiums by at least one entity offering vehicle insurance, based upon said at least one data element,
  communicating information relating to at least said projected insurance premiums to the owner of said vehicle.

28. The method of claim 27, further comprising the steps of communicating information from said electronic marketplace to a communications system associated with the vehicle regarding monitoring reporting options and insurance product information related to said reporting options.

29. The method of claim 27 further comprising the step of:
  allowing said driver to select said monitoring reporting options for a selected time period.

30. A system for offering products or services to a vehicle owner comprising a communications system in association with said vehicle;
  said communications system being coupled to at least one data generating system associated with said vehicle to receive at least one data element selected from the group consisting of an operating state of a vehicle, status of the driver, location of vehicle, an action of said driver during a selected period, external environment or combinations thereof;
  said communications system operated to selectively transmit said at least one data element from said communications system to a processing system, said processing system generating information relating to a product or service using said at least one data element, wherein said information is selectively communicated to the owner of said vehicle or at least one supplier of said product or service.

31. A method of offering products or services to a user comprising the steps of:
  providing a supplier database in an electronic marketplace, said supplier database comprising at least one supplier;
  monitoring at least one data element relating to a user or environment;
  selectively transmitting said at least one data element to an electronic marketplace;
  correlating said at least one data element to at least one supplier found in said supplier database;
  calculating at least a cost of at least one related product or service using said at least one data element and generating information related to said product or service, and communicating said information to said user or said at least one supplier.

* * * * *